May 29, 1956     S. D. POOL     2,747,509
AMMONIA METERING PUMP

Filed Nov. 2, 1951

Inventor:
Stuart D. Pool
By: Paul O. Pippel
Attorney

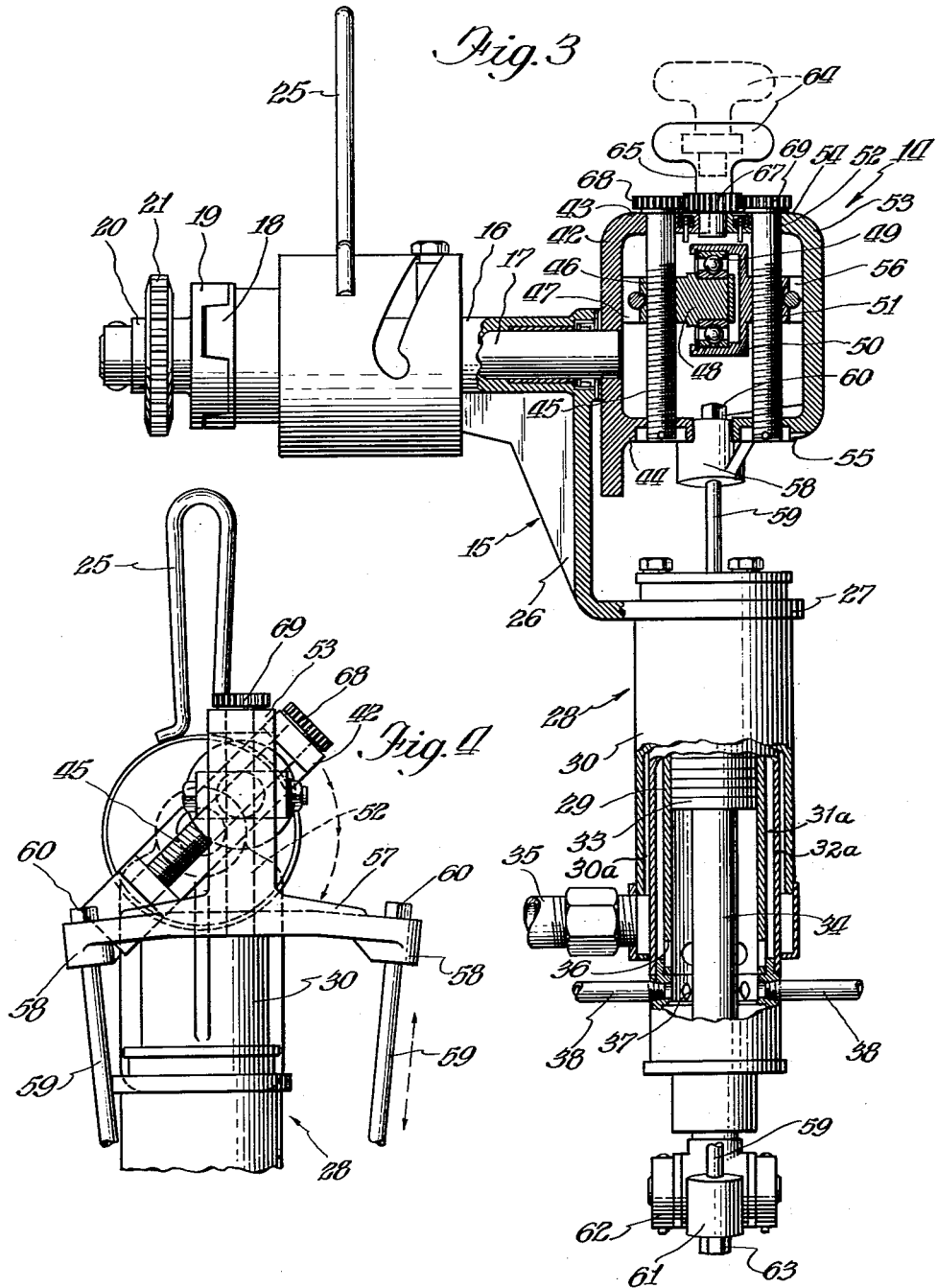

United States Patent Office 2,747,509
Patented May 29, 1956

2,747,509

AMMONIA METERING PUMP

Stuart D. Pool, Moline, Ill., assignor to International Harvester Company, a corporation of New Jersey Application November 2, 1951, Serial No. 254,605

11 Claims. (Cl. 103—38)

This invention relates to pumps and particularly to a pump of the reciprocating piston type. More specifically, the invention concerns a novel pumping mechanism adapted for use upon a tractor or the like to discharge fluids for agricultural purposes.

The use of highly volatile nitrogen-containing fluids such as anhydrous ammonia for supplying nitrogen as fertilizer to the soil is well-known. Such fluids are difficult to control and the rate of discharge thereof into the soil must be adjusted accurately to suit various soil conditions and other requirements. The present invention therefore has for its object the provision of an improved metering pump which can be easily and accurately adjusted to regulate the amount of ammonia to be pumped.

Another object of the invention is the provision of an improved piston pump wherein the amount of ammonia metered by the pump is dependent upon the length of the piston stroke and wherein novel means are provided for adjusting the length of the stroke.

Another object of the invention is the provision in a piston pump wherein the movement of the piston in its cylinder is effected by means of a crank, of means for simultaneously adjusting the throw of the crank and the length of the piston connecting rod so that the piston moves during its entire stroke and reaches the end of its stroke at each revolution of the crank, resulting in an even flow of fluid from the pump to the point or points of discharge. With this construction the piston moves to the end of the cylinder at each stroke, regardless of the length thereof, thus emptying the cylinder completely of ammonia and assuring maximum accuracy in metering the fluid.

Other objects and advantages of the invention will become clear from the following detailed description when read in conjunction with the accompanying drawings, wherein:

Fig. 3 is an enlarged view partly in section of the pumping structure shown in Fig. 1; and Fig. 4 is a detail in end elevation of the pumping structure showing the arrangement of the pitman arms, the drive plates and the clutch throw-out.

Figure 1:
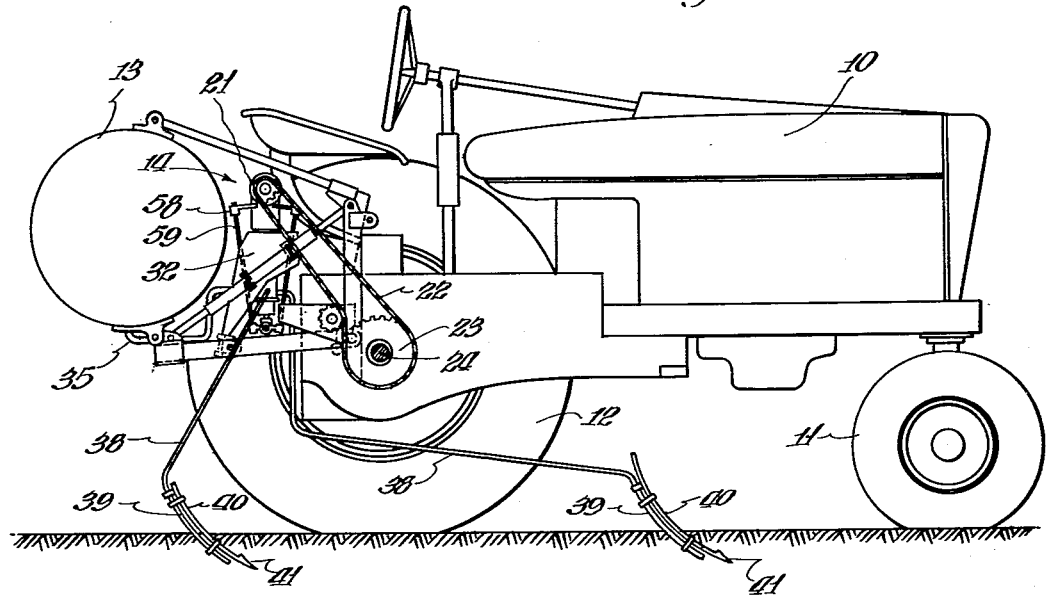
Fig. 1 is a view in side elevation of a tractor having a reservoir and a pump thereon embodying the features of the present invention.
Figure 2:
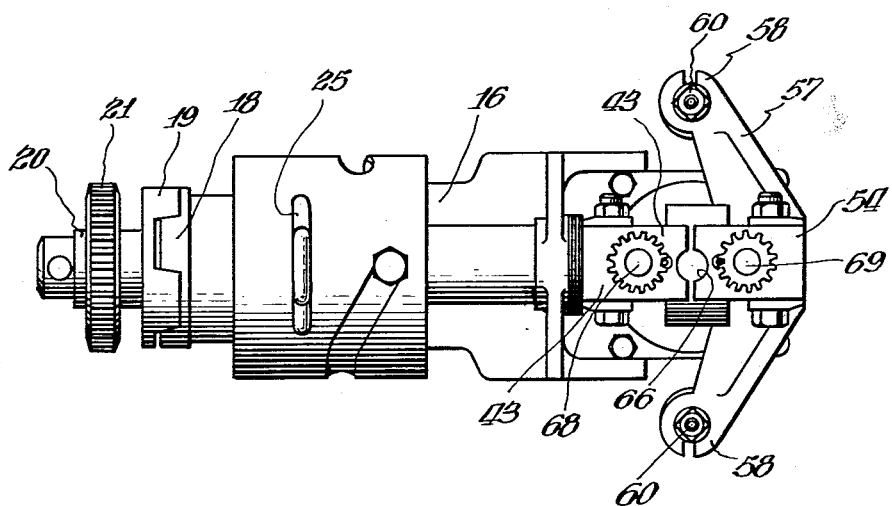
Fig. 2 is a view from above of the pumping structure shown in Fig. 1.

Referring to the drawings, it will be observed that the fluid pump of this invention is associated with a tractor having a body 10, front wheels 11 and rear drive wheels 12, only one of which is shown. As pointed out before, the pump with which this invention is concerned is utilized for pumping liquid from a reservoir designated by the numeral 13 containing anhydrous ammonia and discharging this fluid into the soil to provide fertilizer therefor.

The pump is of the cylinder and piston type and is designated generally by the numeral 14. It is mounted upon a support or frame 15 having a horizontal bearing portion 16 in which is rotatably received a drive shaft 17. Secured to the drive shaft 17 is a clutch part 18 engageable with another clutch part 19 having a hub portion 20 having mounted thereon a sprocket wheel 21. As shown in Fig. 1 the sprocket wheel 21 is drivingly connected by a chain 22 with another sprocket wheel 23 mounted on the tractor axle 24 and driven by the tractor at ground speed. The operation of the clutch parts 18 and 19 forms no part of this invention but it may be understood that the clutch parts are engaged and disengaged by the operation of a throw-out lever 25.

Supporting frame 15 is also provided with an upright bracket portion 26 and another horizontal portion 27 below and parallel to the horizontal bearing portion 16. The frame part 27 supports a pumping unit 28 comprising a cylinder 29 mounted in a housing 30 secured by bolts 31 to a bracket 32 mounted behind the tractor.

A piston 33 is slidable in the cylinder 29 and has secured thereto a piston rod 34, the end of which projects from the cylinder. The constructional details of the cylinder and piston unit form no part of this invention. It may be understood, however, that fluid withdrawn from the tank 13 passes through a pipe 35 connected to the bottom of the tank and passes into a chamber 30a, whence it is directed upwardly in the housing and through suitable inlet valve means, not shown, into a chamber 31a between cylinder 29 and an inner housing 32a. The fluid then passes through the cylinder walls 29 through an opening 36 therein.

Fluid discharged from the cylinder 29 by operation of the piston 33 passes through a plurality of openings 37 having flexible hose 38 connected thereto at circumferentially spaced locations about the cylinder housing. As shown in Fig. 1 each of these flexible hose is connected to a conduit 39 secured to an earth-working tool shank 40 terminating at its lower end in an earth penetrating point 41. Anhydrous ammonia to supply nitrogen to the soil is thus expressed from the tank 13 and through the hose 38 and conduits 39 into the furrow opened by the penetrating tools 41.

It is very important for the operator of the tractor to be able to regulate the quantity of anhydrous ammonia dispensed to the soil with great accuracy in order to provide the required amount of fertilizer for the condition of the soil. It is furthermore highly important that the anhydrous ammonia be dispened in an even and uniform flow of fluid to the furrow formed in the ground. In order to accomplish this the stroke of the piston and the rod in the cylinder must be shortened or lengthened to control the amount of fluid discharged, and this stroke must be complete with the piston moving throughout the entire stroke if an even flow is to be provided. The mechanism for providing the stroke adjustment and for transmitting drive from the drive shaft 17 to reciprocate the piston and rod in the cylinder is now to be described.

To the end of drive shaft 17 there is affixed a driving plate 42 having spaced arms 43 and 44 extending at right angles therefrom. The arms 43 and 44 are apertured to rotatably receive the ends of a threaded rod or bolt 45 upon which is mounted a connecting element or member 46 which has a threaded opening to receive the bolt 45 and to engage the threads thereof. A clamp 47 fits over the edges of the plate 42 and serves as a guide for the movement of connecting member 46 upon the rod 45 for a purpose hereinafter to be set forth.

It may be observed that since plate member 42 is affixed to the drive shaft 17 it and the rod 45 rotate therewith. It should further be observed that the connecting element 46 is eccentric to the axis of the shaft 17 and therefore functions as a crank. The end of the connecting element 46 opposite the clamping part 47 and projecting outwardly from the threaded rod 45 is provided with a journal portion 48 receivable in a ball race 49 mounted in a connecting element in the form of a bearing 50 having a boss portion 51 provided with a threaded opening adapted to receive a second threaded rod or bolt 52 similar to bolt 45, and its ends are rotatably mounted in a driven plate member 53 similar to plate 42 and having arms 54 and 55 extending inwardly at right angles therefrom toward the arms 43 and 44 respectively. Another clamp 56 carried by the member 51 straddles the plate 53 and serves as a guide in the movement of the bearing 50 axially with respect to the threaded rod or bolt 52.

At this point it should be clear that the crank formed by the connecting member 46 and drive plate 42 through its connection by way of bearing 50 with driven plate 53, will cause the latter to reciprocate in a vertical direction as viewed in Figs. 1 and 3.

As will be observed particularly well in Fig. 4, the lower portion of the plate 53 broadens out into a cross head 57 extending from opposite sides of the plate 53 and terminating in bosses 58, which are apertured to receive the upper ends of connecting rods 59, threaded at their upper ends for the reception of nuts 60. The rods 59 straddle the cylinder and piston unit 28 and the lower ends of these rods are received in blocks 61, one of which is provided at each side of the head 62 formed at the projecting end of the piston rod 34. A nut 63 is provided for mounting upon the lower end of each of the rods 59. It will thus be seen that operation of the eccentric or crank formed by the connecting element 46 and the plate 42 transmits rotary motion from the shaft 17 to the driven plate 53 and through the connecting rods 59 to operate the piston 33 in the cylinder 29. It will also be observed that the rods 59 with the cross head 57 and plate 53 function as a pitman to reciprocate the piston in the cylinder.

Fig. 3 shows the threaded rods or bolts 45 and 52 in parallel, with the bolt 45 perpendicular to the axis of shaft 17, and bolt 52 in general alignment with the plane of operation of the piston 33. In Fig. 4 is shown one position of the drive plate 42 during rotation thereof with respect to the drive plate 53.

In order to achieve the desired end of shortening or lengthening the stroke of the piston 33, while providing movement of the piston during its entire stroke and completing the stroke of the piston with each complete revolution of the crank or plate member 42, applicant has provided means for synchronizing the adjustment of the crank throw and of the length of the pitman formed by the rods 49 and plate 53 by adjusting these lengths simultaneously. It should be clear that the throw of the crank or plate 42 is determined by the eccentricity of the connecting member 46 with respect to the axis of shaft 17. This connecting element 46 is therefore made adjustable upon the threaded rod 45. Likewise, the length of the pitman by which the piston 33 is reciprocated in the cylinder is altered by moving the bearing 50 axially with respect to the bolt 52. The piston therefore moves to the end of the cylinder with each stroke, regardless of the length of the stroke. As long as connecting element 46 is eccentric with respect to the shaft 17, the pitman and the piston of the cylinder will reciprocate, and the farther the element 46 from the axis of the shaft, the greater the throw thereof and therefore the stroke imparted to the piston. Conversely, when the element 46 is in alignment with the axis of shaft 17, no reciprocatory movement whatever is imparted to the pitman and the cylinder piston.

Adjustment of the two connecting elements 46 and 50 is accomplished by mechanism in the form of a key 64 having a shank portion 65 receivable in an opening 66 provided between the adjacent ends of the arms 43 and 54. Mounted upon the shank 65 is a gear 67 which, upon insertion of the shank 65 in the opening 66, engages simultaneously a gear 68 mounted upon the end of threaded rod 45 projecting from the arm 43 of the plate 42 and a gear 69 mounted upon the upper end of the rod 52. Turning of the key 64 and gear 67 thus rotates the threaded rods 45 and 52 in the same direction to simultaneously move the connecting elements 46 and 50 upon these rods to adjust the throw of the crank 42 and at the same time the stroke of the pump piston.

Operation of the fluid metering pump of this invention should be clearly understood from the foregoing description. However, the invention is defined in the appended claims and is to be considered comprehensive of all forms of structure coming within their scope.

What is claimed is:

1. In a pump having a support, a cylinder carried by the support, a piston and rod slidable in the cylinder, a driven shaft rotatably carried by the support, an eccentric drive member mounted on said shaft and rotatable therewith, said member being radially adjustable to vary its eccentricity, means serving as a pitman connected at one end to said rod, a connecting element at the other end of the pitman, means for connecting said element to said eccentric member for reciprocating the pitman in response to rotation of the shaft, means for adjusting said element to vary the effective length of said pitman, and means operatively connecting said adjusting means to said eccentric member for simultaneously adjusting the eccentricity thereof.

2. In a pump having a support, a cylinder carried by the support, a piston and rod slidable in the cylinder, a driven shaft rotatably carried by the support, a rotatable member mounted on the shaft for rotation therewith, means serving as a pitman connected at one end to said rod, a first connecting element at the other end of the pitman and movable on the pitman to vary the effective length thereof and therefore the length of the piston stroke, a second connecting element on the rotatable member eccentric to the axis of the shaft and radially movable to vary the throw of the eccentric, means interconnecting said elements operable to simultaneously adjust the positions thereof, and an operating connection between said elements for transmitting rotary motion from the shaft to reciprocate the pitman.

3. In a pump having a support, a cylinder carried by the support, a piston and rod slidable in the cylinder, a driven shaft rotatably carried by the support, a rotatable member mounted on the shaft for rotation therewith, means serving as a pitman connected at one end to said rod, a first connecting element at the other end of the pitman and movable on the pitman to vary the effective length thereof and therefore the length of the piston stroke, a second connecting element on the rotatable member eccentric to the axis of the shaft and radially movable to vary the throw of the eccentric, and means for synchronizing the adjustment of said connecting elements to provide a complete stroke of the piston at each revolution of the eccentric member comprising common adjusting means operatively connected to said first and second elements for effecting simultaneous adjustment thereof.

4. In a pump having a support, a cylinder carried by the support, a piston and rod slidable in the cylinder, a driven shaft rotatably carried by the support, a rotatable member mounted on the shaft for rotation therewith, means serving as a pitman connected at one end to said rod, a first connecting element at the other end of the pitman and movable on the pitman to vary the effective length thereof and therefore the length of the piston stroke, a second connecting element on the rotatable member eccentric to the axis of the shaft and radially movable to vary the throw of the eccentric, means for synchronizing the adjustment of said connecting elements to provide a complete stroke of the piston at each revolution of the eccentric member comprising parallel threaded shafts carried by the pitman and the rotatable member, threaded openings formed in said connecting elements to receive the respective of said shafts, and means common to said threaded shafts for rotating the latter simultaneously.

5. In a pump having a support, a cylinder carried by the support, a piston and rod slidable in the cylinder, a driven shaft rotatably carried by the support, a rotatable member mounted on the shaft for rotation therewith, means serving as a pitman connected at one end to said rod, a first connecting element at the other end of the pitman and movable on the pitman to vary the effective length thereof and therefore the length of the piston stroke, a second connecting element on the rotatable member eccentric to the axis of the shaft and radially movable to vary the throw of the eccentric, means for synchronizing the adjustment of said connecting elements to provide a complete stroke of the piston at each revolution of the eccentric member comprising a first threaded shaft carried by the rotatable member perpendicular to the axis of the drive shaft, a second threaded shaft carried by the pitman generally parallel to the axis of the cylinder and piston, threaded openings formed in said connecting elements to receive the associated threaded shafts, and means for turning the threaded shafts to move said elements thereon.

6. In a pump having a support, a cylinder carried by the support, a piston and rod slidable in the cylinder, a driven shaft rotatably carried by the support, a rotatable member mounted on the shaft for rotation therewith, means serving as a pitman connected at one end to said rod, a first connecting element at the other end of the pitman and movable on the pitman to vary the effective length thereof and therefore the length of the piston stroke, a second connecting element on the rotatable member eccentric to the axis of the shaft and radially movable to vary the throw of the eccentric, means for synchronizing the adjustment of said connecting elements to provide a complete stroke of the piston at each revolution of the eccentric member comprising a first threaded shaft carried by the rotatable member and rotatable therewith during operation of the pump, a second threaded shaft carried by the pitman for reciprocation therewith, threaded openings formed in said connecting elements to receive the associated threaded shafts, means for turning the threaded shafts to move said elements thereon comprising gears on said shafts, and single means adapted to mesh with said gears when the threaded shafts are in parallelism for simultaneously turning said threaded shafts.

7. In a pump having a support, a cylinder carried by the support, a piston and rod slidable in the cylinder, a driven crank carried by the support for rotation on an axis perpendicular to that of the cylinder and piston, a connecting element on the crank radially movable to vary the throw of the crank, means for connecting the crank to the piston to transmit motion for reciprocating the latter comprising another element carried by the piston rod for connection to the element on the crank, said element on the piston rod being axially adjustable relative thereto to vary the stroke thereof in the cylinder, and adjusting means operatively connecting said connecting elements for simultaneously varying the positions thereof.

8. In a pump having a support, a cylinder carried by the support, a piston and rod slidable in the cylinder, a driven crank carried by the support for rotation on an axis perpendicular to that of the cylinder and piston, a connecting element on the crank radially movable to vary the throw of the crank, means for connecting the crank to the piston to transmit motion for reciprocating the latter comprising another element carried by the piston rod for connection to the element on the crank, said element on the piston rod being axially adjustable relative thereto to vary the stroke thereof in the cylinder, and means for adjusting said connecting elements in synchronism to simultaneously vary the throw of the crank and the stroke of the piston, comprising a rod member in general alignment with said piston, means securing the associated element to said rod member for axial adjustment thereon, a second rod member carried by the crank and rotatable therewith, said rod having the associated connecting element mounted thereon for adjustment to vary the throw of the crank, and means for simultaneously adjusting the connecting elements on said rod members.

9. In a pump having a support, a cylinder carried by the support, a piston and rod slidable in the cylinder, a driven crank carried by the support for rotation on an axis perpendicular to that of the cylinder and piston, a connecting element on the crank radially movable to vary the throw of the crank, means for connecting the crank to the piston to transmit motion for reciprocating the latter comprising another element carried by the piston rod for connection to the element on the crank, said element on the piston rod being axially adjustable relative thereto to vary the stroke thereof in the cylinder, and means for adjusting said connecting elements in synchronism to simultaneously vary the throw of the crank and the stroke of the piston, including a threaded rod connected to the piston for reciprocating movement therewith, another threaded rod carried by the crank and rotatable therewith, said threaded rods being adapted to be brought into parallelism when the pump is out of operation, threaded openings formed in said elements to receive the associated threaded rod, and means for advancing said elements on said rods.

10. In a pump having a support, a cylinder carried by the support, a piston and rod slidable in the cylinder, a driven crank carried by the support for rotation on an axis perpendicular to that of the cylinder and piston, a connecting element on the crank radially movable to vary the throw of the crank, means for connecting the crank to the piston to transmit motion for reciprocating the latter comprising another element carried by the piston rod for connection to the element on the crank, said element on the piston rod being axially adjustable relative thereto to vary the stroke thereof in the cylinder, and means for adjusting said connecting elements in synchronism to simultaneously vary the throw of the crank and the stroke of the piston, including a threaded rod connected to the piston for reciprocating movement therewith, another threaded rod carried by the crank and rotatable therewith, said threaded rods being adapted to be brought into parallelism when the pump is out of operation, threaded openings formed in said elements to receive the associated threaded rod, means for advancing said elements on said rods, comprising gears carried by said threaded rods, and means meshing simultaneously with said gears for varying the positions of the connecting elements thereon.

11. In a pump having a support, a cylinder carried by the support, a piston and rod slidable in the cylinder, a driven crank carried by the support for rotation on an axis perpendicular to that of the cylinder and piston, a connecting element on the crank radially movable to vary the throw of the crank, means for connecting the crank to the piston to transmit motion for reciprocating the latter comprising another element carried by the piston rod for connection to the element on the crank, said element on the piston rod being axially adjustable relative thereto to vary the stroke thereof in the cylinder, and means for adjusting said connecting elements in synchronism to simultaneously vary the throw of the crank and the stroke of the piston, including a threaded rod connected to the piston for reciprocating movement therewith, another threaded rod carried by the crank and rotatable therewith, said threaded rods being adapted to be brought into parallelism when the pump is out of operation, threaded openings formed in said elements to receive the associated threaded rod, means for advancing said elements on said rods, comprising gears carried by said threaded rods, and a key having a gear thereon adapted to mesh simultaneously with said gears when said threaded rods are in parallelism.

References Cited in the file of this patent

UNITED STATES PATENTS

| | | |
|---|---|---|
| 273,276 | Hawkinson | Mar. 6, 1883 |
| 427,130 | Stone | May 6, 1890 |
| 437,162 | Miller | Sept. 23, 1890 |
| 924,883 | Bouvier | June 15, 1909 |
| 1,239,059 | Sundh | Sept. 4, 1917 |
| 1,389,547 | Eger | Aug. 30, 1921 |
| 1,874,890 | Burton | Aug. 30, 1932 |
| 2,030,296 | Horstmann | Feb. 11, 1936 |
| 2,148,899 | Carski et al. | Feb. 28, 1939 |